Sept. 27, 1966     D. E. CORNELL III, ETAL     3,274,704
PORTABLE TEACHING MACHINES
Original Filed July 2, 1962     2 Sheets-Sheet 1
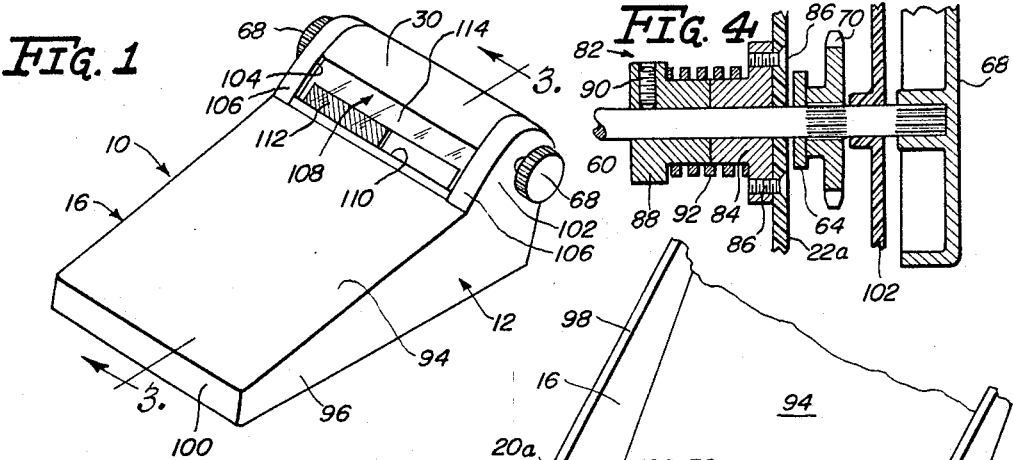
INVENTORS
Dudley E. Cornell, III
Robert A. O'Connell
By John F. Brezina
Atty.

INVENTORS
Dudley E. Cornell, III
Robert A. O'Connell
By John F. Brezina
Atty.

United States Patent Office 3,274,704
Patented Sept. 27, 1966

3,274,704
PORTABLE TEACHING MACHINES
Dudley E. Cornell III, Albuquerque, and Robert A. O'Connell, Cedar Crest, N. Mex., assignors to Teaching Machines, Inc., Albuquerque, N. Mex., a corporation of New Mexico
Continuation of application Ser. No. 206,992, July 2, 1962. This application May 3, 1965, Ser. No. 456,884
3 Claims. (Cl. 35—9)

This application is a continuation of our copending patent application Serial No. 206,992, filed July 2, 1962, now abandoned.

This invention relates to portable teaching machines which are adapted to releasably hold sheets bearing questions and answers thereon, and on exposed areas of which sheets students record answers to successive questions while the correct printed answers are concealed, and which have means for moving the sheets in the machines for thereafter viewing the correct answers and comparing them with the recorded answers.

An important object of the invention is to provide a portable, relatively inexpensive and easily manufacturable teaching machine or device which may be employed for group instruction or for individual self-teaching.

Another object is to provide a teaching machine which is operated manually by simple yet reliable mechanical means.

An additional object is to provide a teaching machine which holds paper sheets or the like bearing printed questions and answers, and answering areas for writing answers thereon, and which displays one question or stimulus at a time together with its answering area while obscuring the printed answer, and thereafter displays the printed answer and written answer together, with the written answer rendered inaccessible to the student, so that the written answer may be checked while alteration thereof is prevented. The machine also includes means for preventing retraction of the sheets, so that the written answer cannot be changed once the printed answer has been viewed.

A further object is to provide a teaching machine or device adapted for use with test sheets each bearing successive multiple groups of regularly disposed questions, answers, and answering areas, and including manually operated mechanical means for advancing the sheets incrementally to answer successive questions and then view the correct answers thereto. When the testing has been completed, the sheets are collected within the machine.

Other objects and accomplishments of the invention include the provision of a teaching machine having a housing including a wall with a writing opening therein; a window panel means in the wall; means for supporting a stack of test sheets within the housing; roller means for moving a sheet from the stack to a position beneath the window panel means and the writing opening, for writing the answer to a question visible through the window panel means in an answering area registering with the writing opening, said roller means, being adapted for thereafter advancing the sheet incrementally to move the answering area out of register with the writing opening and in a position visible through while rendered inaccessible by the window panel means, and to render a correct answer visible through the window panel means for checking the written answer, and thereafter for advancing the sheet incrementally for writing the answers to successive questions and for checking the written answers; and means for collecting the completed sheets in the housing.

The invention also provides a teaching device which includes the combination of a plurality of test sheets each bearing successive multiple groups of regularly disposed questions, answers, and answering areas, and the foregoing structure cooperating therewith.

These and other objects, advantages and functions of the invention will be apparent on reference to the specification and to the attached drawings, in which like parts are identified by like reference symbols in each of the views.

On the drawings:

FIG. 1 is a top perspective view of a preferred embodiment of the teaching machine or device of the invention.

FIG. 2 is an enlarged similar view thereof, with parts broken away and with the cover raised to reveal the interior.

FIG. 3 is an enlarged vertical longitudinal sectional view thereof, taken on line 3—3 of FIG. 1, illustrating the machine in operation.

FIG. 4 is a further enlarged fragmentary cross-sectional view taken on line 4—4 of FIG. 2, illustrating anti-reverse means mounted on a drive shaft in the machine.

Figure 5:
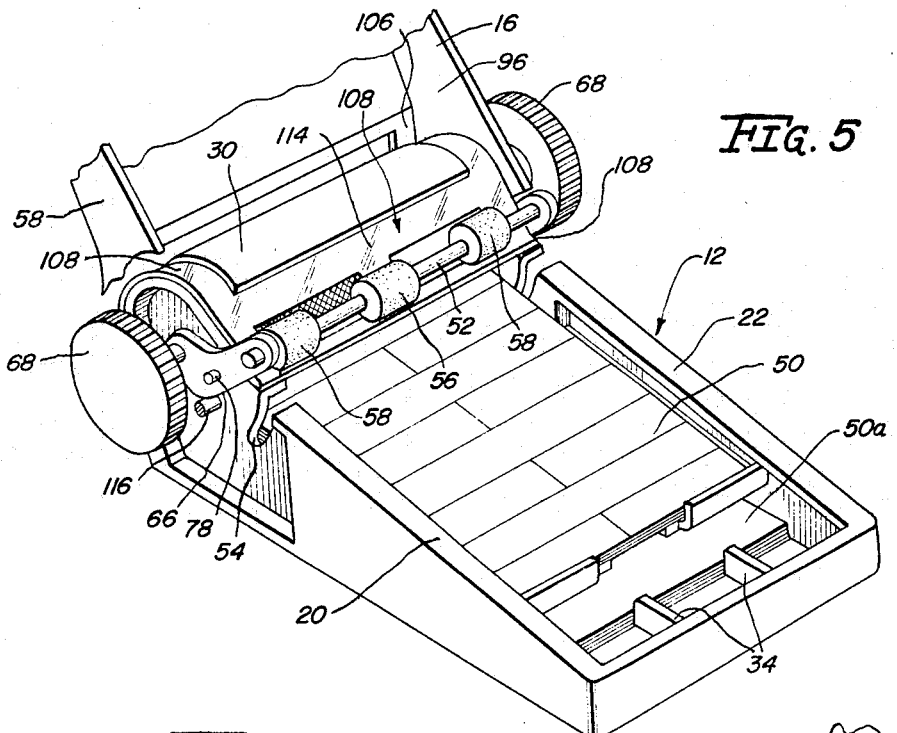
FIG. 5 is a view similar to FIG. 2 taken from the opposite side, illustrating the machine as loaded with test sheets and with a feed roller assembly elevated.

Referring particularly to FIGS. 1–3 of the drawings, a preferred embodiment of the new teaching machine or device is generally indicated by the number 10. A housing 12 is provided, which includes a compartmentalized holder or container 14 and a top cover or closure 16 rotatably mounted thereon for opening and closing the housing. Plastic is a preferred material of construction for the housing, as illustrated, but it may be constructed of metal or other suitable material.

The holder includes a bottom wall or wall panel 18, two parallel upstanding side walls 20 and 22 having inturned and upwardly and rearwardly inclined upper edges 21 and 23, respectively, and an upstanding front end wall 24. The foregoing walls are integral with each other or joined together by suitable means. The holder also includes a back end wall 26 which is secured to the remaining walls and is also detachable therefrom for access to the interior of the holder. The back end wall includes an upstanding panel portion 28 and an integral forwardly and downwardly curved top panel portion 30.

The holder 14 is divided into upper and lower compartments by a paper support panel or shelf 32, which extends thereacross and is spaced rearwardly from the front end wall 24. Two stop bars 34 extend upwardly from the bottom wall 18, to provide stops for completed test sheets which are collected in the lower compartment. A pair of support bars or tabs 36 extend inwardly from each of the side walls 20 and 22 for mounting the panel 32 to support a stack of test sheets thereon.

A stack of sheets is supported initially on a front upwardly and rearwardly inclined tray section or tray 38 of the support panel 32. A transverse guide section 40 is integral with the front tray section 38 at the rear thereof, and is upwardly and rearwardly inclined at a greater angle. A transverse writing section 42 is integral with the guide section at the rear of the latter, and the writing section is inclined upwardly and rearwardly therefrom at a smaller angle. A transverse bridging section 44 is joined to the rear of the writing section 42, and is inclined downwardly and rearwardly therefrom. A central longitudinal roller opening 46 is provided in the bridging section 44. A transverse stripper section 48 is integral with the section 44 and depends from the rear extremity thereof and inwardly spaced from the back wall 26. The foregoing rearwardly disposed sections of the support panel 32 are secured in position by means of bars or tabs (not shown) which extend inwardly from the side walls 20 and 22 similarly to the bars 36.

Figure 8:
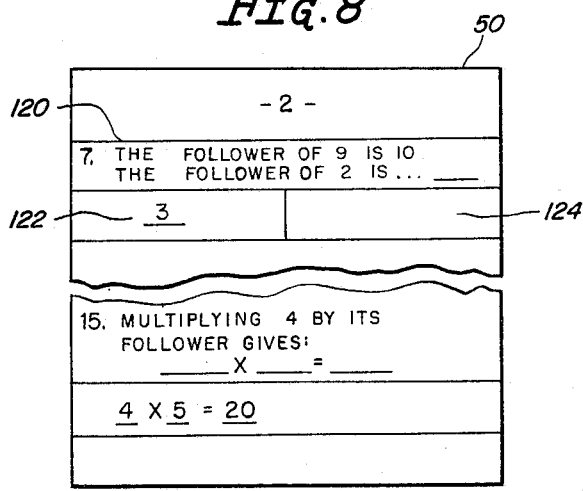
FIG. 8 is a broken plan view of a typical test sheet, bearing questions to be answered and answers thereto, printed or equivalently reproduced thereon, and answering areas thereon.

The teaching device 10 is provided with manually operable mechanical means for successively moving a plurality of test sheets 50 arranged in a stack on the tray section 38 of the support panel 32, as seen in FIGS. 3 and 5. FIG. 8 is an illustration of a test sheet in greater detail. Each sheet from the stack on the tray section 38 is moved into successive answering and checking positions, and thereafter is moved into the lower compartment bounded on the upper side by the panel 32 and on the lower side by the bottom wall 18. The completed test sheets, identified by the symbol 50a, are reversed in the process, and are discharged face down over the bottom wall. They are stacked thereon in their original order in an inverted stack.

The mechanical means include a first rotatable drive shaft 52 which is mounted in the upper compartment, above the supporting panel 32, and over the stack of sheets 50. The shaft is movable up and down over the stack, and it moves in curved edge slots 54 at the tops of the side walls 20 and 22. A first feed roller 56 is keyed or otherwise secured on the shaft 52 for rotation therewith, and the shaft constitutes a drive shaft for the roller. The roller is disposed centrally between the side walls 20 and 22, and it continually rests on the stack of test sheets 50, bearing on the top sheet thereof from the time the device is filled with sheets until the last sheet is removed from the tray section 38. Two guide rollers 58 are also keyed to the shaft 52 at its opposite ends, and they have a smaller diameter than the feed roller 56, so as to contact the top sheet 50 with reduced pressure and serve merely to keep the sheet moving in its proper alignment.

A second rotatable drive shaft 60 is mounted on the holder 14 in spaced parallel relation beyond the first drive shaft 52. The second shaft is journaled in suitable openings in raised rear portions 20a and 22a of the respective side walls 20 and 22. An enlarged second feed roller 62 is keyed on the second shaft, centrally between the side walls. The roller extends through the roller opening 46 in the bridging section 44, which is above the second shaft. The second shaft 60 and the roller 62 thereon serve to move the completed test sheets to the lower compartment of the holder.

As seen clearly in FIGS. 2, 3, 5, and 6, two angular arms 64 and 66 are mounted externally of the respective side walls 22 and 20 and extend therealong. The arms are mounted on the second shaft 60 for pivoting about the shaft axis, and they rotate freely relative to the shaft. The forward ends of the arms are connected to and rotatably support the first shaft 52 journaled thereon. By this construction, the arms move up and down with the first shaft 52 as it moves up and down over the sheets 50. Likewise, when pivotal movement is imparted to the arms, the first shaft is caused to move therewith. As previously noted, the shaft moves in the side wall slots 54. These slots are arcuate with a radius from the axis of the second shaft 60.

The teaching device is manually operated by means of two external knobs 68 fixed to the opposite outwardly extending ends of the second shaft 60. A large spur gear 70 is fixed to the second shaft, between one knob 68 and the adjacent arm 64. A small pinion gear 72 is fixed on the corresponding outwardly extending end of the first shaft 52. Two idler gears 74 and 76 are rotatably mounted on the one arm 64, between the gears 70 and 72 fixed to the respective shafts, and providing a gear train therewith. The first idler gear 74 is the same size as the spur gear 70 on the second shaft, and the second idler gear 76 is the same size as the pinion gear 72 fixed on the first shaft. The larger idler gear 74 is mounted on a cross rod 78 (FIGS. 2, 3, 5, and 6) which extends between the arms 64 and 66, and beneath the support panel 32. The smaller idler gear 76 is mounted on a stud 80, on the one arm 64. In this manner, the shafts are interconnected by coupling means constituting a spur gear train, for operating the shafts and the rollers thereon synchronously. The coupling means are mounted externally of the side wall 22, and the wall functions as a divider or partition separating the coupling means from test sheets being moved in the housing 12 to prevent fouling.

Rotation of either of the knobs 68 causes the first roller 56 and the second roller 62 to rotate in opposite directions. The gears 70, 72, 74, and 76, and the rollers are sized to provide a differential movement of the respective rollers, for a purpose to be described. The peripheral speed of the second roller 62 is slightly greater than that of the first roller 56.

Figure 7:
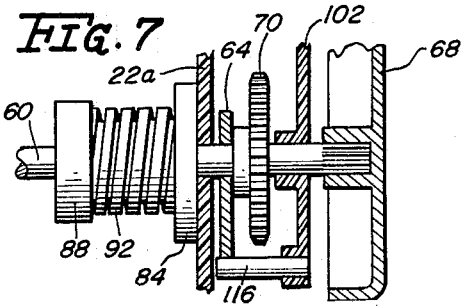
FIG. 7 is an enlarged fragmentary elevational and sectional view like FIG. 4, illustrating the parts disposed as in FIG. 6 and taken substantially on line 6a—6a thereof.

As shown in FIGS. 4 and 7, anti-reverse means generally indicated at 82 are associated with the second shaft 60 for preventing reversal of the desired directions of rotation, or retrograde operation, of the rollers 56 and 62, and thereby preventing retraction of the test sheets 50. The second shaft 60 and the raised portion 22a of one side wall 22 are interengageable by interposed spring brake means acting to prevent the reversal. A journal member 84 is secured on the inner side of the wall in fixed position by screws 86 which extend through the wall into corresponding openings in the journal. The shaft 60 extends through the journal member and is rotatable therein. A brake sleeve 88 is fixed on the shaft by a set screw 90 or other suitable means. A torsion spring 92 is coiled around the journal 84 and the sleeve 88, on inner cylindrical sections of reduced diameter on the respective members. The spring is connected to the sleeve 88 and is in frictional engagement with the reduced sections. When the sleeve 88 is rotated relative to the journal 84 in a direction tending to uncoil the spring, the shaft 60 turns freely. When the sleeve is rotated in the opposite direction, the spring tightens due to frictional engagement with sleeve and journal, and acts as a friction brake on the shaft. The knobs 68 and the shafts 52 and 60 connected thereto thus are freely rotatable to advance the test sheets, with the knobs turning in the clockwise direction as viewed from the right side 22. The construction prevents the knobs and shafts from turning in opposite directions.

Referring especially to FIG. 1, the cover 16 includes a top panel 94, parallel upstanding side panels 96 and 98, and a front end panel 100, the panels being integral or united with each other at their junctions. The side panels 96 and 98 incline upwardly and rearwardly at their upper margins and have rear raised portions 102. The top panel 94 thus inclines upwardly and rearwardly at a convenient slope to provide an arm rest for the student or user while writing answers on the test sheets. The outlines of the side panels 96 and 98 and of the end panel 100 conform respectively to the outlines of the holder walls 22, 20, and 24, and the former substantially register with the latter with the cover panels outermost when the device is closed as illustrated in FIG. 1.

The top panel 94 is upwardly inclined at a greater angle adjacent its back end, and then curves rearwardly and downwardly. A window opening 104 is provided in the upwardly extending end of the top panel and extends substantially thereacross. The window opening is bordered by marginal strips 106, which lie on opposite sides of the curved portion 30 of the end panel 26, in a manner which permits relative movement of the parts without interference.

As seen especially in FIGS. 1, 3, and 5, a transparent or light-transmitting window panel 108 of glass, plastic or the like is mounted in register with the window opening 104 of the cover 16. While such window panel means may be mounted either on the holder 14 or on the cover 16 to accomplish the objects of the invention, the window panel 108 in the illustrative embodiment is mounted on the holder. The panel is seated on the upper edges 21 and 23 of the side panels 20 and 22, principally on the edges of the raised portions 20a and 22a thereof. The panel extends from the forward edge 108a (FIG. 3) along a line to the rear of the first roller 56, to its rear edge 108b on the opposite side of the second roller 62. The panel is bent slightly adjacent the leading edge 108a, extends upwardly and parallel to the writing section 42 of the support panel 32, and then curves over the top of and behind the raised sections 20a and 22a of the sides (see also FIG. 5). As seen in FIG. 1, the panel extends under the curved section 30 of the back wall 26, and its side margins lie beneath the top panel marginal strips 106.

The window panel 108 is provided with a transverse elongated writing opening 110 and an aligned laterally adjacent elongated masking section 112. The opening and the masking section register with the window opening 104 along the forward margin thereof. The masking portion 112 may constitute a portion of the window panel suitably treated to render it opaque, coated or painted with opaque material, or covered with an opaque strip. A transparent strip 114 of the window panel also registers with the window opening 104, extending completely across the window opening and above the mask and writing opening. The top panel 94 of the cover, the curved section 30 of the back panel of the holder, and the window panel 108 thus together provide a top wall on the teaching machine having a window panel and a writing opening therein.

Figure 6:
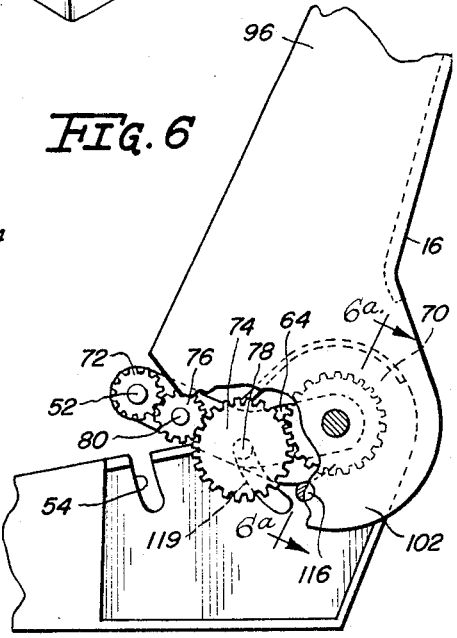
FIG. 6 is an enlarged fragmentary side elevational view of the machine with parts broken away, taken from the side opposite to that shown in FIG. 5 and with the parts in the same positions.

In using the teaching machine 10, a stack of test sheets or the like such as illustrated in FIG. 8 is loaded on the tray section 38 between the side walls 20 and 22, with the indicia on the sheets facing upwardly, as seen in FIG. 5. For this purpose, the cover 16 is mounted on the second shaft 60 for rotation relative thereto, as seen in FIGS. 4 and 6. The shaft extends through corresponding openings in the raised side portions 102 of the cover, and the side portions are adjacent to the knobs 68. The side portions 102 of the cover are provided with inwardly extending pins, bosses or the like 116 which are engageable with the arms 64 and 66, as illustrated in FIGS. 5–7. When the cover 16 is raised, the pins 116 abut on the arms and lift them, the arms moving about the axis of the second shaft 60. The first shaft 52 is raised thereby, moving in the slots 54. The cross rod 78 also moves upwardly in closed wall slots 119 (FIGS. 3 and 6) having radii from the second shaft 60, and the slots limit upward movement of the parts. A stack of sheets 50 then may be inserted beneath the first roller 56.

Should it be desirable to substitute another window panel for the panel 108, for use with test sheets bearing differently arranged indicia, this may be done simply by removing the back panel 26, lifting the window panel off of the edges 21 and 23 of the side walls, mounting another window panel, and replacing the back panel. The cover 16 is next lowered to close the device, and it may be locked to the holder 14 by any suitable locking means, not shown.

The top sheet 50 is advanced to a position beneath the window panel 108 by turning one of the knobs 68, which causes the first feed roller 56 to rotate, by means of the second shaft 60 connected to the knobs, and the gear train interconnecting the first and second shafts. The first roller moves the top sheet 50 thereunder, against and over the support panel guide section 40, and to a position on the writing section 42 and between it and the window panel. The sheet is moved along a straight movement path lying between the side walls 20 and 22, with the guide rollers 58 assisting in this movement.

Referring to FIGS. 1 and 8 in particular, the first question and answer grouping is disposed with the question or stimulus 120 thereof in the upper transparent section 114 of the window panel. The printed correct answer 122 lies beneath and is concealed by the mask 112. The answering or writing area 124 registers with the writing opening 110. The student then rests his forearm on the top cover panel 94 and writes an answer in the answering area 124. One of the knobs 68 is rotated an additional increment, whereupon the printed answer 122 and the answering area 124 move into positions beneath the transparent panel section 114. The printed answer becomes visible, and the answering area with the written answer thereon is visible through the window panel while rendered inaccessible to the student thereby. The anti-reverse mechanism 82 prevents rotation of the knobs 68 and reverse movement of the shafts 52 and 60, so that the sheet cannot be moved back to a position where the answering area 124 registers with the writing opening 110. The student thus is prevented from changing his answer upon learning the correct answer.

The foregoing procedure is repeated for successive groups of questions and answers. As the sheet 50 is advanced along its movement path between the side walls 20 and 22, it assumes one position as illustrated for the top sheet 50 in FIG. 3. The writing section 42 of the support panel 32 is generally tangential to the upper forward surface of the second roller 62. The sheet advances between the roller and the rear section of the window panel 108, which provides a friction surface and directing channel with the roller. The sheet advances further in its movement path around the roller and is turned downwardly along the back end wall 26 at the back of the roller. The sheet is there stripped from the roller by the stripper section 48, and moves in its movement path on curved guide members 125 extending upwardly from the bottom wall 18. The sheet finally is moved into the lower compartment after advancing past the window panel. The sheet is collected in the lower compartment on the bottom wall 18 between the side walls 20 and 22. The side wall 22 separates the coupling gears 70, 72, 74 and 76 from the tray section 38, the lower compartment, and the sheet movement path therebetween, to prevent the test sheets from becoming fouled in the gears during operation.

When the trailing edge of the sheet 50 clears the first feed roller 56, that roller engages the next succeeding sheet 50 in the stack. The second roller 62 rotates with a slightly greater peripheral speed, as previously described. Consequently, the top sheet 50 at this time is moved by the second roller 62 away from the first roller 56 at a greater rate than the latter roller moves the next sheet beneath the window panel 108. The sheets are separated by the time the next sheet reaches the writing section 42 beneath the window panel, so that the latter sheet is moved unobstructedly beneath the window panel.

The top sheet, and each succeeding sheet, is moved by the second roller 62 downwardly along the back end wall 26 and on the guides 125 into the lower compartment, and is turned over in the process of moving. The sheet is deposited in face down position on the bottom wall 18 and against the stop tabs 34. Succeeding sheets are stacked thereon in the same manner. When all of the sheets have been collected in the lower compartment, the device is unlocked, and the cover 16 is raised. The stack of completed sheets is removed by reaching into the lower compartment in front of the tray section 38, and lifting the sheets out of the holder. The stops 34 enable the stack to be easily grasped and removed. When the stack is turned over, the completed sheets are found to be arranged in their original sequence, and they may be reviewed in an orderly manner. They serve as a valuable permanent record of the results and also may be reviewed at a later time by the student.

Diverse types of questions or stimuli may be provided in the teaching machine 10 for appropriate testing and education of students. Other regular groupings of questions, answers, and answering areas may be employed, and other suitable window panels may be employed in place of the panel 108. The test sheets 50 may be made of various materials and in various sizes.

The new teaching device has numerous advantages. It is simple in construction and operation. It may be used for complicated and difficult answers. The student is given credit only for correct answers, yet the teaching device provides for differences in form of expression among students. The device also takes into consideration differences in the rapidity of learning among students. The device is completely coordinated in its operation, with the questions and answers always properly arranged with the writing areas. It has the advantage of increasing the student's retentivity by having him write out the answers, and the written answers may be checked rapidly and conveniently, immediately after they are written. The written answers then are not subject to change, so that the device constitutes a useful and reliable means of testing.

While the foregoing specification sets forth the invention in specific terms, it is to be understood that numerous changes may be made without departing from the spirit and scope of the invention, and it is contemplated that various changes and modifications may be made in the embodiment of the invention herein specifically described without departing from or sacrificing any of the advantages or features of the invention, and nothing herein shall be construed as a limitation upon the invention, its concepts or structural embodiment as to the whole or any part thereof except as defined in the appended claims.

We claim:

1. In a teaching machine adapted for use with test sheets each bearing successive multiple groups of regularly disposed questions, answers, and answering areas,
   a housing;
   means for supporting a stack of test sheets within said housing;
   means for collecting the test sheets in said housing;
   means providing a movement path for test sheets from said supporting means to said collecting means;
   a wall in said housing having a writing opening therein adjacent said movement path;
   window panel means in said wall adjacent said movement path;
   masking means on said wall adjacent said movement path;
   a first rotatable shaft mounted on said housing over said stack of sheets and movable up and down thereover;
   first roller means mounted on said first shaft rotatably therewith and resting on said stack of sheets for moving the top sheet from said stack to a position beneath said window panel means and said writing opening;
   a second rotatable shaft mounted on said housing and spaced beyond said first shaft;
   second roller means mounted on said second shaft rotatably therewith for moving said top sheet to said collecting means;
   means for operating said first and second roller means synchronously including a manually operated knob and coupling means connected to said first and second shafts;
   and a divider separating said coupling means from said sheet supporting means, said collecting means, and said movement path, said divider having openings therein and said first and second shafts projecting through said openings for connection to said coupling means, thereby separating said coupling means from test sheets being moved in said housing to prevent fouling;
   whereby upon operating said knob, said top sheet is moved by said first roller means to a position wherein a question is visible through said window panel means, its answer is obscured by said masking means, and its answering area registers with said writing opening for writing the answer to said question on the answering area,
   and thereafter said top sheet is advanced to move said answering area out of register with said writing opening and in a position visible through while rendered inaccessible by said window panel means, and the answer to said question is rendered visible through said window panel means for checking the written answer,
   and thereafter said top sheet is advanced for writing the answers to successive questions and for checking the written answers thereto with said sheet disposed as aforesaid,
   and said top sheet is moved by said second roller means to said collecting means after advancing past said window panel means,
   and the remaining sheets in said stack are moved successively in like manner to said top sheet.

2. In a teaching machine adapted for use with test sheets each bearing successive multiple groups of regularly disposed questions, answers, and answering areas,
   a housing including a compartmentalized holder for test sheets;
   a cover rotatably mounted on said holder for opening and closing the housing, said cover having a window opening therein;
   window panel means having a writing opening therein and masking means thereon both registering with said window opening, said window panel means covering the remainder of said window opening;
   an upper compartment in said holder including panel means for supporting a stack of test sheets therein and enclosed by said cover for preventing access thereto except through said writing opening;
   a first rotatable shaft mounted in said upper compartment over said stack of sheets and movable up and down thereover;
   first roller means mounted on said first shaft rotatably therewith and resting on said stack of sheets for moving the top sheet from said stack to a position beneath said window opening and said window panel means, said support panel means guiding said top sheet to said position and supporting the sheet therein for writing on the sheet through said writing opening;
   a second rotatable shaft mounted on said holder and spaced beyond said first shaft,
   said cover being mounted on said second shaft for relative rotation about the shaft axis;
   second roller means mounted on said second shaft rotatably therewith for moving said top sheet at a greater rate than moved by said first roller means;
   an arm mounted on said second shaft for pivoting about the shaft axis, and connected to said first shaft journaled thereon;
   means for operating said first and second roller means synchronously including a manually operated knob and coupling means connected to said first and second shafts;
   means associated with said means for operating said roller means preventing retrograde operation of said first and second roller means thereby;
   and a lower compartment in said holder communicating with said second roller means for collecting the test sheets in said housing;

whereby upon operating said knob, said top sheet is moved by said first roller means to a position wherein a question is visible through said window panel means, its answer is obscured by said masking means, and its answering area registers with said writing opening for writing the answer to said question on the answering area, and thereafter said top sheet is advanced to move said answering area out of register with said writing opening and in a position visible through while rendered inaccessible by said window panel means, and the answer to said question is rendered visible through said window panel means for checking the written answer, and thereafter said top sheet is advanced for writing the answers to successive questions and for checking the written answers thereto with said sheet disposed as aforesaid, and said top sheet is moved by said second roller means to said lower compartment after advancing past said window panel means, and the remaining sheets in said stack are moved successively in like manner to said top sheet with successive sheets being separated from each other for moving them unobstructedly beneath said window panel means.

3. A teaching machine as defined in claim 2 including means on said cover engageable with said arm when the cover is moved to open the housing, for raising said first shaft to insert said stack of sheets thereunder.

References Cited by the Examiner

UNITED STATES PATENTS

| | | | |
|---|---|---|---|
| 408,209 | 8/1889 | Burnet | 271—36 |
| 650,410 | 5/1900 | Morin | 271—36 |
| 3,106,026 | 10/1963 | Jackson et al. | 35—9 |
| 3,146,532 | 9/1964 | Shwisha et al. | 35—9 |

EUGENE R. CAPOZIO, *Primary Examiner.*

SHELDON S. BENDER, *Assistant Examiner.*